Aug. 13, 1940.　　K. W. HALLDEN　　2,211,418
FLYING CUTTING DEVICE
Filed Nov. 13, 1939　　2 Sheets-Sheet 1
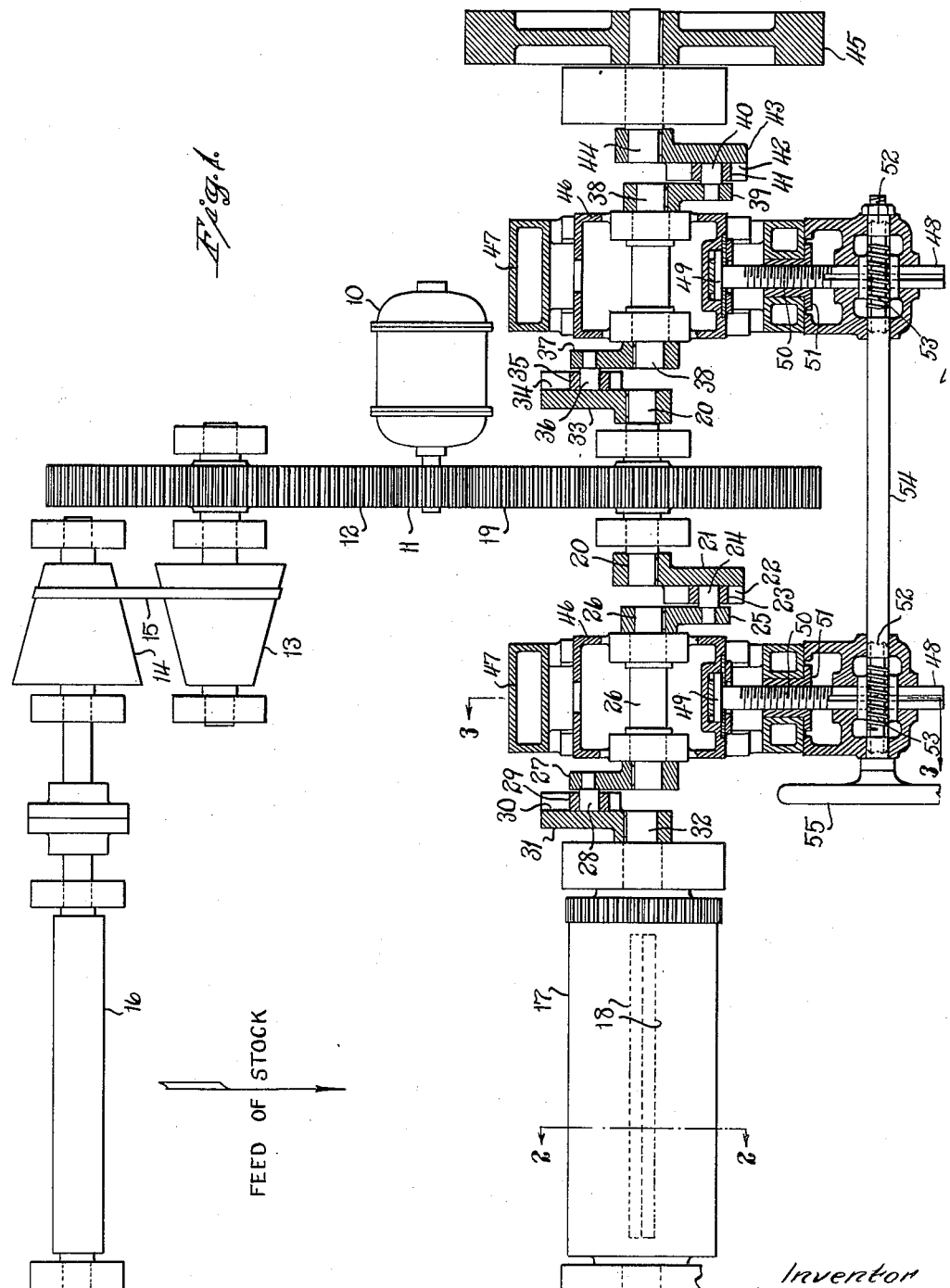

Aug. 13, 1940.  K. W. HALLDEN  2,211,418
FLYING CUTTING DEVICE
Filed Nov. 13, 1939  2 Sheets-Sheet 2
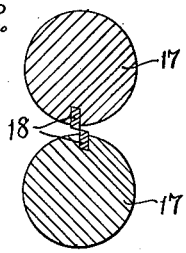
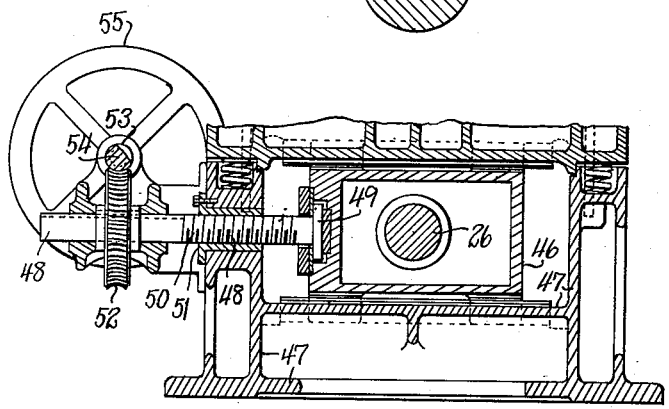
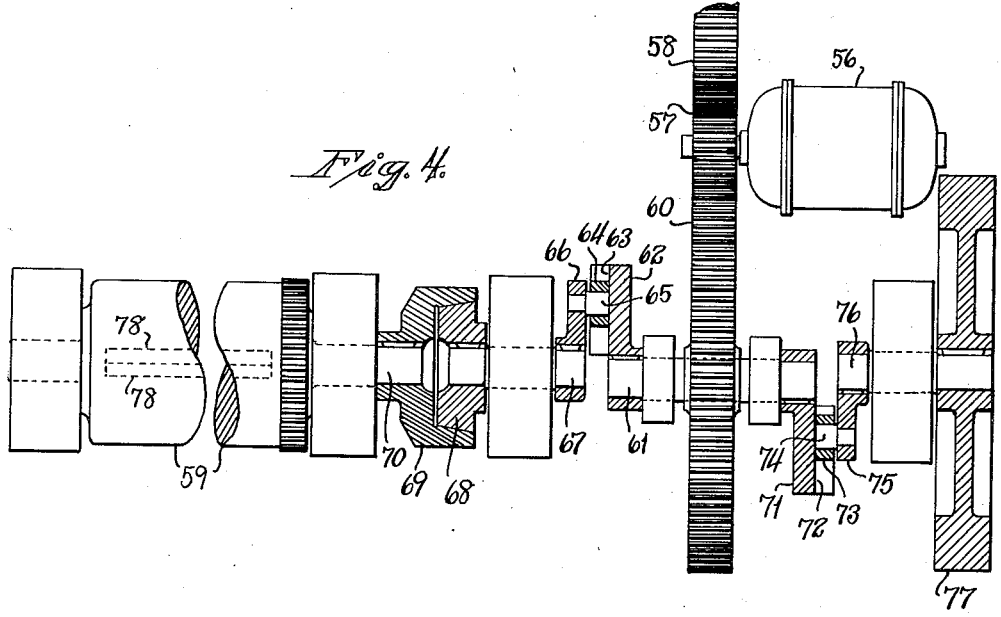
Inventor
Karl W. Hallden
by Seymour Earl Nichols
Attorneys Patented Aug. 13, 1940

2,211,418

UNITED STATES PATENT OFFICE 2,211,418

FLYING CUTTING DEVICE

Karl W. Hallden, Thomaston, Conn.

Application November 13, 1939, Serial No. 303,992

6 Claims. (Cl. 164—68)

This invention relates to improvements in flying cutting devices, and more particularly to rotary flying cutting devices having means for synchronizing the speed of the cutters with the speed of the stock, at the time of cut.

One object of this invention is to provide an improved rotary flying cutting device adapted to be adjusted so that stock can be cut into any of various lengths while the stock is being fed, with means for synchronizing the speed of travel of the cutters with the speed of feed of the stock at the time of cut, together with counterbalance-means to counterbalance any surge that may be present in the cutter-carriers.

With the above and other objects in view, as will appear to those skilled in the art from the present disclosure, this invention includes all features in the said disclosure which are novel over the prior art.

In the accompanying drawings forming part of the present disclosure, in which certain ways of carrying out the invention are shown for illustrative purposes:

Fig. 1 is a schematic plan view, partly in section, illustrating one embodiment of the invention in the form of a counterbalanced synchronous rotary flying shear;

Fig. 2 is a sectional view on line 2—2 of Fig. 1;

Fig. 3 is a fragmental sectional view on line 3—3 of Fig. 1; and

Fig. 4 is a schematic plan view, partly in section, of a modified form of the invention.

In the description and claims, the various parts are identified by specific names for convenience, but they are intended to be as generic in their application as the prior art will permit.

In order to be able to cut stock into any of various desired lengths while it is being fed without interruption, it is necessary to be able to vary the speed of rotation of the cutters, or the speed of rotation of the feed-rolls or the speed of rotation of both the cutters and the feed-rolls. In the particular embodiments of the invention illustrated in the drawings, the speed of the feed-rolls is varied in order to accomplish cuts of different lengths while the stock is being fed. But regardless of which method is used for securing variations in the length of stock being cut, it is important to provide adjustable means so that the speed of travel of the cutters or cutter-means can be synchronized or made the same as the speed of feed of the stock at the instant of cut.

In order to bring about the proper synchronization of the speed of travel of the cutters with the speed of feed of the stock at the instant of cut, when employing mechanism of the type set forth in the drawings, it is necessary to introduce a greater or less degree of surge or variable-angular-velocity in the cutter-carriers, with consequent strains and stresses in the mechanism due to this non-uniform or irregular motion. It is an object of the present invention to counteract this surge of the cutter-carriers by producing a surge of opposite character in a counterbalance-means so that the surge of the latter tends to nullify the harmful effects of the surge of the former.

Referring to the particular embodiment of the invention illustrated in Figs. 1, 2 and 3 of the drawings, the electric motor 10 through gears 11 and 12 and cone pulleys 13 and 14 and belt 15, drives the feed-rolls 16 (only one of which is here shown) to feed the stock to be cut, to the cutter-rolls or cutter-carriers 17, each of which is provided with a cutter or cutter-blade 18.

The motor 10 drives the cutter-carriers 17 through the gears 11 and 19, a primary driving-shaft 20 having secured thereon a crank-arm 21 which has a radial slot 22 in which rides a roller 23 pivotally mounted on a stud-shaft 24 secured in a crank-arm 25 which in turn is secured on a secondary driving-shaft or offset-shaft 26, the other end of which shaft 26 has secured thereto a second crank-arm 27 carrying a stud-shaft 28 on which is rotatably mounted a roller 29 which rides in a radial slot 30 of a crank-arm 31 which is secured upon a driven-shaft or shaft-extension 32 of one of the cutter-carriers 17.

Similarly, the primary driving-shaft 20 has secured to its other end, a crank-arm 33 which has a radial slot 34 in which rides a roller 35 rotatably mounted on a stud-shaft 36 secured in a crank-arm 37 which in turn is secured to a secondary driving-shaft or offset-shaft 38, the other end of the offset-shaft 38 having another crank-arm 39 secured thereto and carrying a stud-shaft 40 on which is rotatably mounted a roller 41 which rides in a radial slot 42 of a crank-arm 43 secured on a driven-shaft 44, on the other end of which is secured a counterbalance-means in the form of a wheel 45.

Each of the offset-shafts 26 and 38 is mounted in a bearing 46 mounted to be adjusted horizontally in guideways in the base or frame 47 by means of a screw-shaft 48 swiveled to the bearing 46 at 49 and provided with screw-threads 50 threadedly engaging the threaded bushing 51 which latter is fixedly secured in the base 47. The outer end of each screw-shaft 48 is keyed to a worm-wheel 52 which is rotatable by a worm 53 secured or formed on an adjusting-rod or -shaft 54, at one end of which is secured an adjusting-wheel 55. The upper portion of the construction of Fig. 3 (not shown) may be made in any suitable way, as for example in the way shown in Figs. 2 and 3 of the Patent #2,067,513 granted on January 12, 1937 to Howard H. Talbot.

It will be observed that by rotating the hand-wheel 55 in one direction that the bearings 46 carrying the two offset-shafts 26 and 38 will be moved in a direction to offset both of these shafts a still greater amount from the axis of shafts 20, 32 and 44, or if the hand-wheel 55 is rotated in the opposite direction, the shafts 26 and 38 will be adjusted back toward the axis of the shafts 20, 32 and 44, and continued rotation of the hand-wheel 55 in such direction will actually align the shafts 26 and 38 with the other three shafts, and still further continued movement of the rotation of the hand-wheel 55 in such direction will adjust the shafts 26 and 38 to the opposite side of the axis of the shafts 20, 32 and 44. During any such adjustment of the shafts 26 and 38, the rollers 23, 29, 35 and 41 move correspondingly along the slots in the respective crank-arms with which they engage.

The gear 19 and primary driving-shaft 20 are driven at uniform-angular-velocity by the motor 10. When the shaft 26 is aligned with the shafts 20 and 32 then the uniform-angular-velocity is transmitted to the cutter-carriers 17, which latter are geared together so that one drives the other, in a usual manner. But when the shaft 26 is adjusted in either direction to offset it from the axis of the shafts 20 and 32, then the uniform-angular-velocity of the shaft 20 is changed to a non-uniform-angular-velocity of the shaft 32 and the cutter-carriers 17 and cutters 18 driven thereby. The average-angular-velocity of the shaft 32 remains the same as the average-angular-velocity of the shaft 20 but at one part of the rotation of the shaft 32 the latter has a lesser angular-velocity than the shaft 20 while at another portion of rotation of the shaft 32 the latter has a higher angular-velocity than the shaft 20. Thus, by suitable adjustment of the shaft 26, it is possible to introduce a suitable degree of surge into the cutter-carriers 17 and the cutters carried thereby, so that at the instant of cut, the cutters will be travelling at the same speed as the speed of feed of the stock which is being fed by the feed-rolls 16, in order that the speed of travel of the cutters may thus be synchronized with the speed of feed of the stock at the instant of cut.

The non-uniform-angular-velocity or surge which is thus introduced into the cutter-carriers 17, owing to the heavy weight of the latter, brings about undesirable stresses and strains in the mechanism which reduce the life and accuracy of the machine. It is for this reason that the counterbalance-means before described, is connected with the cutter-carriers 17 so that at all times, for any adjustments of the shafts 26 and 38, a non-uniform motion or surge of opposite character to that of the cutter-carrier means is introduced into the counterbalance-means 45. In other words, when the cutter-carrier means is accelerating, the counterbalance-means is decelerating, and vice versa, and in equal degree. This non-uniform motion of the counterbalance-means 45 is of opposite character to that of the cutter-carrier means 17 because the pair of crank-arms 21, 25 extends oppositely to the pair of crank-arms 33, 37, and the pair of crank-arms 27, 31 extends oppositely to the pair of crank-arms 39, 43.

In the form of the invention illustrated in Fig. 4, the electric motor 56 could drive feed-rolls (not shown) in a similar manner to that illustrated in Fig. 1, through mechanism including gears 57 and 58.

The motor 56 drives the cutter-carriers 59 through the gears 57 and 60, an offset- or driving-shaft 61 having secured thereon a crank-arm 62 which has a radial-slot 63 in which rides a roller 64 pivotally mounted on a stud 65, which latter is secured in a crank-arm 66 which, in turn, is secured to the driven-shaft 67, the other of which shaft 67 has secured thereto a friction-clutch member or element 68 adapted to be frictionally engaged with a complemental friction-clutch member 69, which latter is secured on a shaft or shaft-extension 70 of one of the cutter-carriers 59, only one of which cutter-carriers 59 is shown, as they are the same as the cutter-carriers 17. The friction-clutch members or elements 68 and 69 are adapted to be adjusted rotationally with respect to one another and secured together in any of such relative rotational positions for a purpose to be later explained.

Similarly, the offset- or driving-shaft 61 has secured on the other end thereof, a crank-arm 71 which has a radial slot 72 in which rides a roller 73 rotatably mounted on a stud-shaft 74 secured in a crank-arm 75 which, in turn, is secured to a driven-shaft 76, the other end of the shaft 76 having secured thereon a counterbalance-means in the form of a wheel 77.

The uniform speed of rotation of the shaft 61 produced by the motor 56 acts through the pair of crank-arms 62 and 66 to give a non-uniform rotation or surge to the shaft 70 and the cutter-carriers 59, while the oppositely-disposed pair of crank-arms 71 and 75 give a non-uniform rotation or surge of opposite character to the counterbalance-wheel 77. In other words, when the cutter-carrier means is accelerating, the counterbalance-means is decelerating and vice versa, and in equal degree. In a construction such as is illustrated in Fig. 4, in which the offset-shaft 61 does not have its degree of offset adjustable, the degree and character of surge introduced into the cutter-carriers and counterbalance-wheel is of a fixed type. But by means of the clutch elements 68, 69 it is possible to introduce a rotational adjustment between the elements 68 and 69 so that, in one adjusted position, for example, the cutters 78 of the cutter-carriers 59 will come together in cutting position, say at the point of maximum surge, in order to accomplish synchronization with a given rate of feed of the stock to be cut, whereas other rotational adjustments of the clutch parts 68 and 69 will bring the cutters into cutting relation at lesser rates of surge. By suitably adjusting the clutch elements 68, 69 rotationally relative to one another, any desired necessary speed of surge at the instant of cut can be obtained in order to synchronize the speed of travel of the cutters with the speed of feed of the stock at the instant of cut. And the pair of crank-arms 71, 75 imparts a non-uniform motion or surge of opposite character to the counterbalance-wheel 77.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A flying cutting device, comprising: rotatably-mounted cutter-carrier means provided with cutter-means; feed-means adapted to feed stock to said cutter-means; driving-means for driving said cutter-carrier means and said feed-means to cause said cutter-means to cut said stock while it is being fed; said driving-means including speed-changing means for changing the average relative speeds of the feed-means and cutter-means and including angular-velocity-varying means adapted to cause said cutter-carrier means to be rotated with a non-uniform motion to permit of synchronizing the speed of travel of the cutter-means with the speed of feed of the stock, at the time of cut; counterbalance-means; and other angular-velocity-varying means interconnecting said cutter-carrier means and said counterbalance-means and adapted to cause said counterbalance-means to rotate with a non-uniform motion of opposite character to that of the cutter-carrier means; one of said angular-velocity-varying means including offset driving- and driven-shafts, each said shaft having a crank-arm, and said crank-arms being so engaged with one another that the driven-shaft is rotated with a non-uniform motion.

2. A flying cutting device, comprising: rotatably-mounted cutter-carrier means provided with cutter-means; feed-means adapted to feed stock to said cutter-means; driving-means for driving said cutter-carrier means and said feed-means to cause said cutter-means to cut said stock while it is being fed; said driving-means including speed-changing means for changing the average relative speeds of the feed-means and cutter-means and including angular-velocity-varying means adapted to cause said cutter-carrier means to be rotated with a non-uniform motion to permit of synchronizing the speed of travel of the cutter-means with the speed of feed of the stock, at the time of cut; counterbalance-means; and other angular-velocity-varying means interconnecting said cutter-carrier means and said counterbalance-means and adapted to cause said counterbalance-means to rotate with a non-uniform motion of opposite character to that of the cutter-carrier means; the angular-velocity-varying means including a driving-shaft offset from and intermediate of two driven-shafts, the driven-shafts respectively driving the cutter-carrier means and the counterbalance-means; said driving- and driven-shafts having crank-arms such that the driving-shaft has a crank-arm so engaged with a crank-arm on each driven-shaft that each driven-shaft is rotated with a non-uniform motion of opposite character to the non-uniform motion of the other driven-shaft.

3. A flying cutting-device, comprising: rotatably-mounted cutter-carrier means provided with cutter-means; feed-means adapted to feed stock to said cutter-means; driving-means for driving said cutter-carrier means and said feed-means to cause said cutter-means to cut said stock while it is being fed; said driving-means including speed-changing means for changing the average relative speeds of the feed-means and cutter-means and including angular-velocity-varying means adapted to cause said cutter-carrier means to be rotated with a non-uniform motion to permit of synchronizing the speed of travel of the cutter-means with the speed of feed of the stock, at the time of cut; counterbalance-means; and other angular-velocity-varying means interconnecting said cutter-carrier means and said counterbalance-means and adapted to cause said counterbalance-means to rotate with a non-uniform motion of opposite character to that of the cutter-carrier means; one of the said angular-velocity-varying means including offset driving- and driven-shafts, each said shaft having a crank-arm, and said crank-arms being so engaged with one another that the driven-shaft is rotated with a non-uniform motion; and adjustable coupling-means for changing the angular relationship between said cutter-carrier means and said first-mentioned angular-velocity-varying means.

4. A flying cutting device, comprising: rotatably-mounted cutter-carrier means provided with cutter-means; feed-means adapted to feed stock to said cutter-means; driving-means for driving said cutter-carrier means and said feed-means to cause said cutter-means to cut said stock while it is being fed; said driving-means including speed-changing means for changing the average relative speeds of the feed-means and cutter-means and including angular-velocity-varying means adapted to cause said cutter-carrier means to be rotated with a non-uniform motion to permit of synchronizing the speed of travel of the cutter-means with the speed of feed of the stock, at the time of cut; counterbalance-means; and other angular-velocity-varying means interconnecting said cutter-carrier means and said counterbalance-means and adapted to cause said counterbalance-means to rotate with a non-uniform motion of opposite character to that of the cutter-carrier means; the angular-velocity-varying means including a driving-shaft offset from and intermediate of two driven-shafts, the driven shafts respectively driving the cutter-carrier means and the counterbalance-means; said driving- and driven-shafts having crank-arms such that the driving-shaft has a crank-arm so engaged with a crank-arm on each driven-shaft that each driven-shaft is rotated with a non-uniform motion of opposite character to the non-uniform motion of the other driven-shaft; and adjustable coupling-means for changing the angular relationship between said cutter-carrier means and said first-mentioned angular-velocity-varying means.

5. A flying cutting device, comprising: rotatably-mounted cutter-carrier means provided with cutter-means; feed-means adapted to feed stock to said cutter-means; driving-means for driving said cutter-carrier means and said feed-means to cause said cutter-means to cut said stock while it is being fed; said driving-means including speed-changing means for changing the average relative speeds of the feed-means and cutter-means and including angular-velocity-varying means adapted to cause said cutter-carrier means to be rotated with a non-uniform motion to permit of synchronizing the speed of travel of the cutter-means with the speed of feed of the stock, at the time of cut; counterbalance-means; and other angular-velocity-varying means interconnecting said cutter-carrier means and said counterbalance-means and adapted to cause said counterbalance-means to rotate with a non-uniform motion of opposite character to that of the cutter-carrier means; one of said angular-velocity-varying means including offset driving- and driven-shafts, each said shaft having a crank-arm, and said crank-arms being so engaged with one another that the driven-shaft is rotated with a non-uniform motion, and one of said offset shafts being adjustable to increase or decrease its degree of offset relatively to the other.

6. A flying cutting device, comprising: rotatably-mounted cutter-carrier means provided with cutter-means; feed-means adapted to feed stock to said cutter-means; driving-means for driving said cutter-carrier means and said feed-means to cause said cutter-means to cut said stock while it is being fed; said driving-means including speed-changing means for changing the average relative speeds of the feed-means and cutter-means and including angular-velocity-varying means adapted to cause said cutter-carrier means to be rotated with a non-uniform motion to permit of synchronizing the speed of travel of the cutter-means with the speed of feed of the stock, at the time of cut; counterbalance-means; and other angular-velocity-varying means interconecting said cutter-carrier means and said counterbalance-means and adapted to cause said counterbalance-means to rotate with a non-uniform motion of opposite character to that of the cutter-carrier means; the angular-velocity-varying means including two driven-shafts respectively driving the cutter-carrier means and the counterbalance-means, two shafts respectively offset from and for driving the respective driven-shafts, a primary driving-shaft intermediate of and for driving said offset shafts, four pairs of crank-arms, one pair of which crank-arms is between and in driving relation with each two adjacent shafts, the crank-arms of each pair being so engaged with one another that each driven-shaft is rotated with a non-uniform motion of opposite character to the non-uniform motion of the other driven-shaft, and the offset shafts being adjustable to increase or decrease their degree of offset relatively to the driven-shafts.

KARL W. HALLDEN.